United States Patent
Rutzen et al.

(10) Patent No.: US 10,883,239 B2
(45) Date of Patent: Jan. 5, 2021

(54) SHARK BARRIER (71) Applicant: Stellenbosch University, Stellenbosch (ZA)

(72) Inventors: Michael Rutzen, Gansbaai (ZA); Sara Andreotti, Gansbaai (ZA); Pierre Becker, Milnerton (ZA); Laurie Barwell, Matieland (ZA)

(73) Assignee: Stellenbosch University, Stellenbosch (ZA)

( * ) Notice: Subject to any disclaimer, the term of this patent is extended or adjusted under 35 U.S.C. 154(b) by 221 days.

(21) Appl. No.: 16/090,202

(22) PCT Filed: Mar. 24, 2017

(86) PCT No.: PCT/IB2017/051701
§ 371 (c)(1),
(2) Date: Sep. 28, 2018

(87) PCT Pub. No.: WO2017/168294
PCT Pub. Date: Oct. 5, 2017

(65) Prior Publication Data
US 2019/0119873 A1 Apr. 25, 2019

(30) Foreign Application Priority Data

Mar. 30, 2016 (ZA) .................... 2016/02093
Mar. 30, 2016 (ZA) .................... 2016/02094
(Continued)

(51) Int. Cl.
*E02B 1/00* (2006.01)
*B63C 9/05* (2006.01)
(Continued)

(52) U.S. Cl.
CPC ............ *E02B 1/006* (2013.01); *A01M 29/30* (2013.01); *B63C 9/00* (2013.01); *B63C 9/05* (2013.01);
(Continued)

(58) Field of Classification Search
CPC ............ E02B 1/00; E02B 1/006; A01K 61/00
(Continued)

(56) References Cited

U.S. PATENT DOCUMENTS 2,709,984 A * 6/1955 Marks .................... E02B 1/003
                                                    119/220
4,130,994 A    12/1978 Van Moss, Jr.
(Continued)

FOREIGN PATENT DOCUMENTS

FR          3025777 A1      3/2016
WO    WO-2014/083514 A1    6/2014

OTHER PUBLICATIONS

"Sharksafe Barrier With Great White Sharks"; Jun. 30, 2013; retrieved from https://www.youtube.com/watch?v=IOfJL-Rbwtw&t=98s.
(Continued)

*Primary Examiner* — Richard T Price, Jr.
(74) *Attorney, Agent, or Firm* — Winstead PC (57) ABSTRACT

A shark barrier that comprises an anchoring assembly having a pair of anchors (9) with a flexible connecting element (11) extending between the anchors. The shark barriers also includes multiple spaced apart buoyant resiliently flexible elongate members (15) that are secured at one end along a length of the connecting element of the anchoring assembly to operatively extend generally upwardly from the connecting element. The buoyant members comprise an elongate flexible spine (32) that extends through a series of tubular members (38).

10 Claims, 8 Drawing Sheets (30) Foreign Application Priority Data

| Mar. 30, 2016 | (ZA) | ................................ | 2016/02095 |
| Mar. 30, 2016 | (ZA) | ................................ | 2016/02096 |
| Mar. 30, 2016 | (ZA) | ................................ | 2016/02097 |

(51) Int. Cl.
  *A01M 29/30* (2011.01)
  *B63C 9/00* (2006.01)
  *F16B 1/00* (2006.01)

(52) U.S. Cl.
  CPC ........ *F16B 1/00* (2013.01); *B63C 2009/0088* (2013.01); *F16B 2001/0064* (2013.01)

(58) Field of Classification Search
  USPC .................................. 119/219, 220; 43/17.1
  See application file for complete search history.

(56) References Cited

U.S. PATENT DOCUMENTS

| 5,448,968 | A | * | 9/1995 | Ostlie | .................... | A01K 79/02 |
| | | | | | | 119/220 |
| 5,460,123 | A | * | 10/1995 | Kolz | ...................... | A01K 79/02 |
| | | | | | | 119/220 |
| 6,582,612 | B1 | * | 6/2003 | White | .................... | A01K 63/04 |
| | | | | | | 210/747.6 |
| 6,905,287 | B2 | * | 6/2005 | Doolaege | ............... | E02B 8/085 |
| | | | | | | 405/81 |
| 6,917,294 | B2 | * | 7/2005 | Larsen | .................. | A01K 75/00 |
| | | | | | | 340/573.2 |

OTHER PUBLICATIONS

"Sharksafe Barrier: Bull Sharks, Part I"; Feb. 11, 2014; retrieved from https://www.youtube.com/watch?v=leSkS4VMDgc&t=147s.

"Sharksafe Barrier: Bull Sharks, Part II"; Mar. 5, 2014; retrieved from https://www.youtube.com/watch?v=DYpOp9HJPFg.

O'Connell et al.; "Bull shark (*Carcharhinus leucas*) exclusion properties of the sharksafe barrier and behavioral validation using the ARIS technology"; Global Ecology and Conservation; No. 2; Oct. 24, 2014; pp. 300-314.

International Search Report; dated Jun. 13, 2017; Authorized Officer—Zsolt Szekely.

* cited by examiner

SHARK BARRIER

CROSS-REFERENCE(S) TO RELATED APPLICATIONS

This application claims priority from South African provisional patent application numbers 2016/02093, 2016/02094, 2016/02095, 2016/02096 and 2016/02097, which are incorporated by reference herein.

FIELD OF THE INVENTION

This invention relates to a barrier for preventing sharks from accessing designated areas.

BACKGROUND TO THE INVENTION

Sharks play a vital role in managing healthy ecosystems. The majority of shark species prey on fish and smaller aquatic life such as molluscs and clams. Bigger species of sharks, however, generally feed on larger animals such as sea lions, seals and bigger fish.

Sharks have fallen victim to a reputation as fierce man-hunting predators and over the years various cases of shark attacks on humans have been documented.

In order to combat shark attacks, coastlines and beaches are often safeguarded with anti-shark devices to reduce the encounters between people and sharks. Various anti-shark devices have been used including shark nets, drum lines, exclusion nets and other shark barriers.

Shark nets are large-meshed nets designed to entangle and catch sharks, thereby reducing the population thereof within the vicinity of enclosed beaches. These nets are typically secured at two ends by independent anchors and laid submerged in two spaced apart parallel rows a few hundred meters offshore and in water depths of approximately 10 to 14 meters. Although fairly effective in reducing the number of sharks, shark nets do not form a complete barrier and sharks can swim over, under or around the nets. It is therefore not uncommon for sharks to be found on the shore-side of shark nets and many of these are then often caught in the nets when leaving the protected area. In addition to this, other aquatic creatures such as turtles and dolphins are often caught and killed in the nets.

Drum lines are often used in addition or as an alternative to shark nets and are designed to attract and capture sharks with baited hooks, rather than to form a barrier between bathers and sharks.

Exclusion nets have smaller mesh sizes and create a physical barrier beyond which sharks, and many other aquatic creatures, cannot pass. They extend vertically from the sea floor to just below the surface. Although exclusion nets are not designed to capture sharks and are therefore generally less detrimental to the environment, the nets exclude generally all marine animals larger than the net mesh, and are also not suitable for certain high-swell regions and are impractical for protecting large areas.

Sharks are known to avoid entering into kelp forests and seals often hide in kelp forests to avoid shark attacks. Sharks are also known to be deterred by magnetism. The applicant provides a shark barrier that comprises multiple resiliently flexible, elongate members extending upright from the sea floor to resemble a kelp forest. Each resiliently flexible elongate member of this shark barrier typically comprises several segments connected to each other by a hinge, rope or chain. The flexibility of the resiliently flexible elongate members allows the shark barrier to be used in high-swell regions and extend to a height at or near the sea surface.

It has also been found that because the shark barrier is mostly submerged, wear and tear, such as rust or biofouling, can cause the connection points between segments to be points of weakness.

There is therefore a need for a shark barrier that alleviate at least some of the problems referred to above.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a shark barrier comprising an anchoring assembly having a pair of anchors with a flexible connecting element extending between the anchors, and multiple spaced apart buoyant resiliently flexible elongate members secured at one end along a length of the connecting element of the anchoring assembly to operatively extend generally upwardly from the connecting element, the buoyant members comprising an elongate flexible spine extending through a series of tubular members.

Further features of the invention provide for the shark barrier to comprise three or more spaced apart anchors and a separate flexible connecting element extending between each pair of adjacent anchors; for the anchors to be interconnected in a linear arrangement to define a single row; for the shark barrier to comprise two or more adjacent rows of interconnected anchors in linear arrangement; and for the adjacent linear rows to be off-set relative to each other to form a staggered arrangement.

An even further feature of the invention provides for the flexible connecting element to be releasable from the anchors.

A still further feature of the invention provide for the connecting element to extend through a plurality of spacers which are arranged between adjacent buoyant resiliently flexible elongate members extending upwardly from the connecting element.

An even further feature of the invention provides for the shark barrier to have a zone consisting of buoyant resiliently flexible members that are greater in length than the remaining resiliently flexible elongate members, the buoyant resiliently flexible elongate members forming part of the zone being operatively arranged to extend beyond the sea surface to define a passageway for water vehicles.

Still further features of the invention provide for the buoyant resiliently flexible elongate members of the shark barrier to include spacers arranged between adjacent tubular members, the spacers being dimensioned to engage with the tubular members to retain them in predetermined locations along a length of the flexible spine; for one or more of the tubular members to be closed at both ends by an end cap, the tubular members housing one or more magnets and buoyant material.

Even further features of the invention provide for the flexible spine to be a cable, a rope, a chain or a buoyant tube; for the connecting element to be an electrical conductor and for the shark barrier to comprise an electrical source for providing electricity through the connecting element; and for the anchors to include multiple spaced apart securing formations along a length thereof for removable attachment to the connecting element.

An embodiment of the invention will now be described, by way of example only, with reference to the accompanying drawings.

DETAILED DESCRIPTION WITH REFERENCE TO THE DRAWINGS

Figure 1:
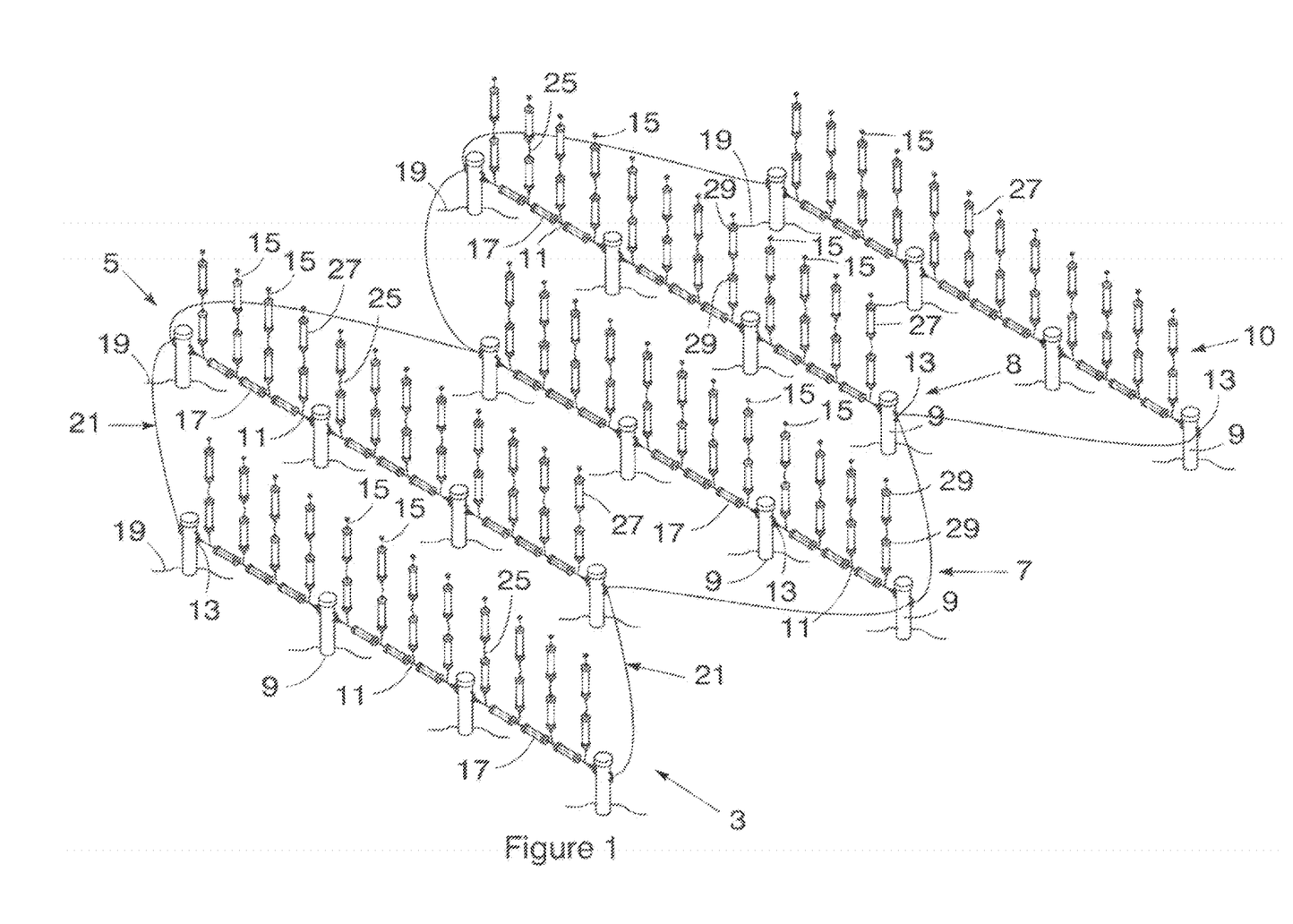
FIG. 1 illustrates a three-dimensional view of one embodiment of a shark barrier.

In the embodiment of the invention shown in FIG. 1 the shark barrier (1) includes five generally parallel adjacent linear rows (3, 5, 7, 8, 10) of spaced apart anchors (9) interconnected by separate flexible connecting elements, in this embodiment connection cables (11). Each flexible connection cable is secured at one end to a securing formation (13) located at an operatively upper portion of an anchor and at its opposite end to a securing formation (13) of an adjacent anchor. A plurality of spaced apart buoyant resiliently flexible elongate members (15) are secured at one end along a length of each connection cable and extend generally upwardly from the connection cable. The buoyant members (15) are spaced apart by means of tubular members, acting as spacers (17) fitted over the connection cables (11) and in between adjacent buoyant members.

The adjacent linear rows (3, 5, 7, 8, 10) are anchored into the sea floor (19) to be off-set relative to each other to form a staggered arrangement. This arrangement creates the impression of a kelp forest when viewed under the water, which is known to be deterrent for many shark species. The adjacent rows may be interconnected by means of additional connection cables (21) secured to an anchor of a first row and to corresponding anchors of adjacent rows.

Figure 2:
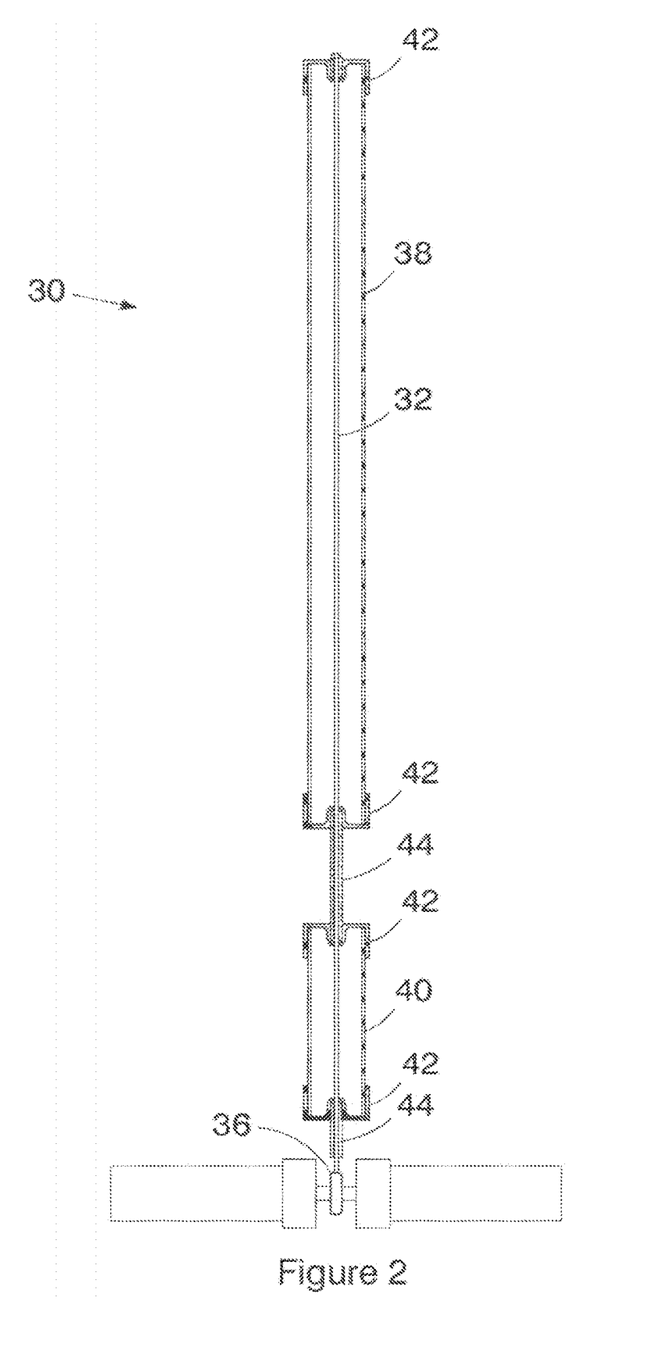
FIG. 2 illustrates a sectional view along a length of a buoyant member forming part of a shark barrier.

In this embodiment, the shark barrier includes four buoyant members (15) between each pair of anchors (9) to form a separate, removable section of the shark barrier. It is, however, appreciated that any number of buoyant members may be secured between any two given anchors. The buoyant members are kept in place and spaced apart by means of the horizontally positioned spacers (17) fitted over the operatively horizontal connection cable. Each buoyant member comprises a flexible spine, in this embodiment a cable (25), which extends through a series of operatively vertically arranged tubular members (27). The tubular members are secured in position on the spine cable (25) by end caps (29) fitted over either end of each tubular member (27). Each buoyant member also includes a spacer to retain the tubular members a predetermined distance apart on the flexible spine. As shown in FIG. 2, the spacer may be a rubber sleeve (44).

Figure 3:
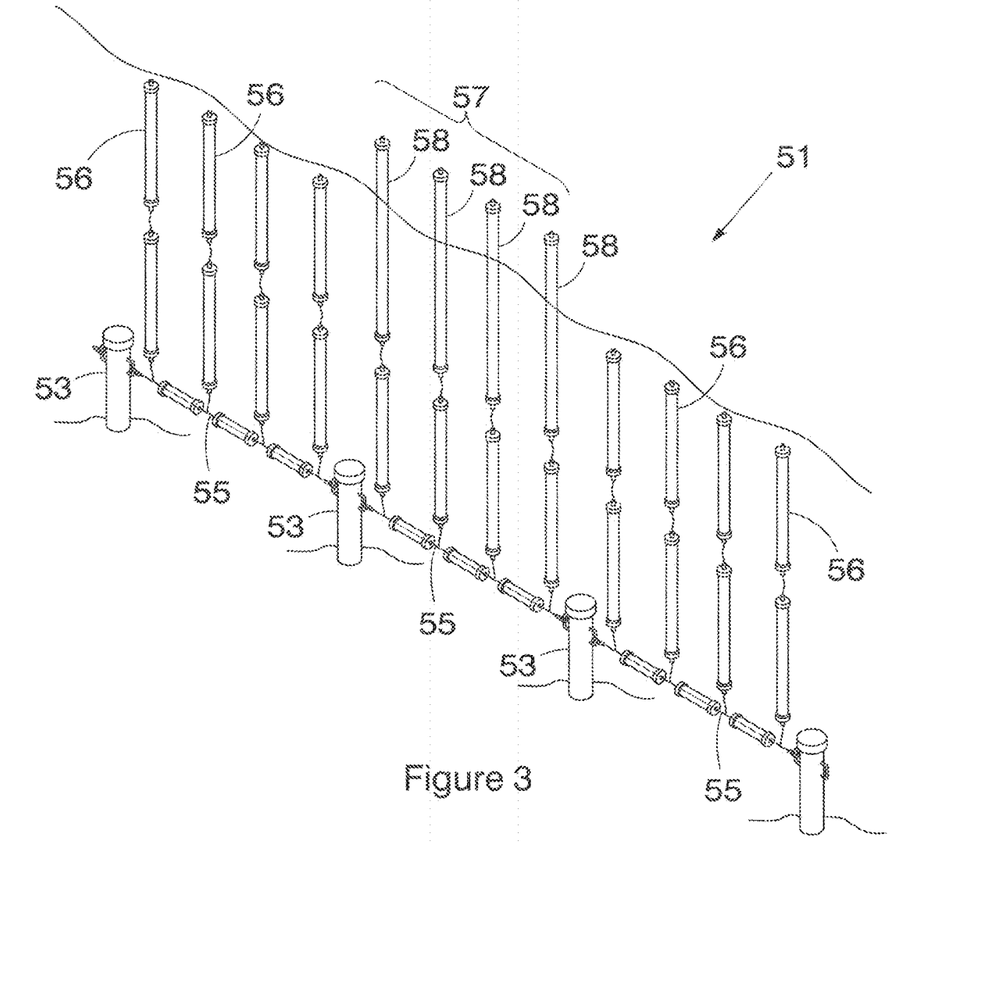
FIG. 3 illustrates a three-dimensional view of an alternative embodiment of a shark barrier.

In the embodiment of the invention shown in FIG. 3, the shark barrier (51) comprises a single row of spaced apart anchors (53) interconnected by separate connection cables (55) and having multiple buoyant members (56) secured at one end to the operatively horizontal connection cable and extending in an operatively vertical condition from the sea floor to the sea surface. The shark barrier includes a zone (57) consisting of buoyant members (58) that are greater in length than the rest of the buoyant members (56). In use, the longer buoyant members extend above the sea surface sufficiently to permit for changes in the water level (tide) and their parting by a bow of a boat, a ship or other water vehicle. The height of the longer buoyant members also enhances their visibility to operators and serves to identify a safe route across the barrier. The longer elongate members (58) in the entry zone (57) will typically extend about 1 meter above the sea surface, whereas the other shorter elongate members (57) extend to a height at or near the sea surface. This embodiment of the invention is especially useful in passageways, such as harbour entries. It is appreciated that the shark barrier including an entry zone is not limited to a single row of anchors and accompanying connections cables and buoyant members. It may comprise multiple staggered rows to better resemble a kelp forest.

The anchors (9) shown in FIG. 1 are glass fibre pipes of approximately 8 to 10 cm in diameter and approximately 5 to 7 meters, more preferably 3 to 5 meters in length. The diameter of the glass fibre anchors are such that they can house magnets. The glass fibre pipes are especially useful in areas having sandy and/or muddy seafloors. In order to anchor the glass fibre pipes into the seafloor, each pipe is oriented to a vertical condition and placed on the seafloor. A pressure source, such as a high pressure water pump or high pressure air pump, is then connected over the upper open end of each pipe and pressure is applied through each pipe. By supplying sufficient pressure through the pipe, the sand and/or mud underneath each pipe give way. This creates a cavity in the sand/and/or mud into which the glass fibre pipe drops, burying the pipe partially within the seafloor in an operatively upright condition. Based on test runs conducted by the applicant, it appears that approximately half of the length of the pipe must be buried in the sand and/or mud so as to be sufficiently anchored to withstand currents and other environmental factors.

As best shown in FIG. 1, each connection cable (11) is secured to securing formations (13), in this embodiment eyelets, positioned on an operatively upper portion of the anchors (9). The connection cables (11) typically have carabiners at either end which is secured to the securing formations provided on the glass-fibre anchors.

The level of sandy seafloors are known to change from time to time. As the level of the seafloor drops, the gap between the horizontal connection cable and the seafloor may increase to an undesired extent. Sharks can potentially avoid the shark barrier and enter the swimming area by swimming underneath the connection cable of the shark barrier. In order to counter this from happening, a secondary securing formation, such as an eyelet, located closer towards the operatively bottom portion of the anchor may be provided on each anchor. When the need arises, the connection cable may be removed from the primary eyes at be secured to the secondary eyelets.

The anchoring assembly of this invention is not limited to hollow anchors, such as glass fibre pipes. The anchors may also be cement blocks, preferably built into tyres. It is also appreciated that rods may be used as anchors or that the anchors may be manufactured from any suitable composite material, such as carbon fibre or other fibre-based product.

Figure 4:
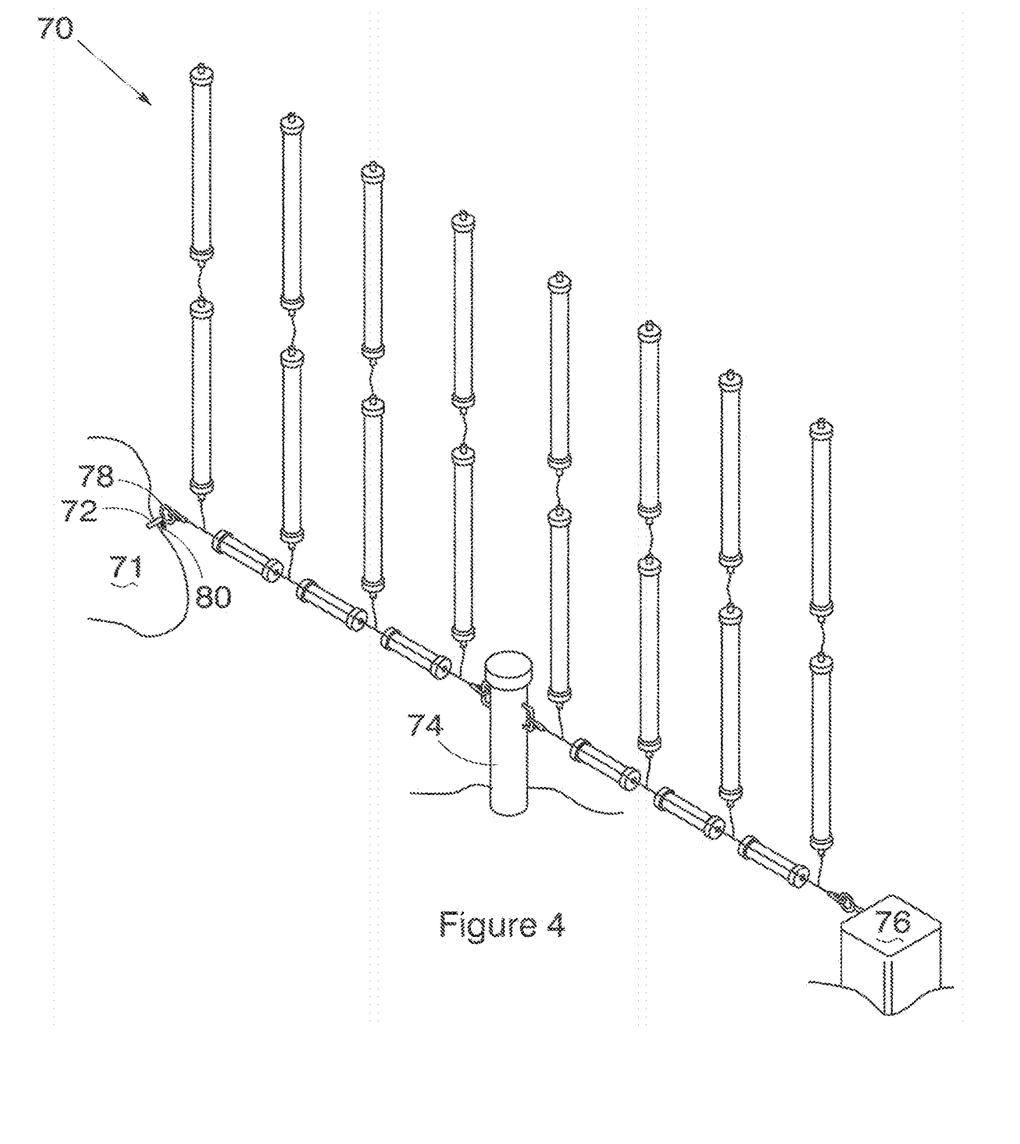
FIG. 4 illustrates a three-dimensional view of a further embodiment of a shark barrier.

In the embodiment shown in FIG. 4, the shark barrier (70) includes a single row of anchors, each anchor being different. The first anchor is a rod (72) drilled into rock or coral, the second anchor is a glass-fibre tube (74) and the third anchor is a cement block (76). When installing the shark barrier onsite, a hole is drilled into the rock or coral (71). The rod is then secured into the hole by means of any suitable adhesive. The metal rod typically has a number of eyes (78, 80) vertically spaced apart. The glass-fibre anchor (74) is planted into the sea floor as explained above and the cement block (76) is dropped into a suitable location on the sea floor. It is also appreciated that the cement block may be secured to rocky seafloors or coral by suitable means such as adhesive or binding agents.

The connection cable is secured to the anchors by means of securing means located at either end of each connection cable. In one embodiment, the securing means are carabiners located at either end of each connection cable. The carabiner is secured to the securing member, such as a U-shaped member or eyelet extending from each of the anchors. It should be appreciated that the connecting element can also be a chain, a wire or a rope having securing means at their respective ends. Although the connection cable used in the testing phase was approximately 5 meters in length, it will be appreciated that the cable can be of any desired length, depending on the given circumstance.

In one embodiment, the shark barrier includes an electricity source for supplying electricity through the connection cable which, in this embodiment, is an electrical conductor. A pulsating electric current will thus run through the connection cable. The electric current provided by the electricity source will be such that a person touching the flexible connection cable will only experience a slight shock. Sharks, however, are believed to be much more sensitive to electric shocks and it is believed that his may add to the "physical barrier" aspect of the shark barrier.

As best shown in FIG. 2, each buoyant member (30) comprises a spine, in this embodiment a cable (32), secured at one end along a length of the operatively horizontal connection cable that extends between two adjacent anchors (not shown). The spine is secured to the connection cable by means of a swivel (36). The spine cable (32) extends operatively upwardly from the connection cable in the general direction of the sea surface and extends through multiple tubular members (38, 40) secured in position on the cable by end caps (42) fitted over either end of each tubular member. Each buoyant member (30) also includes a spacer, in this embodiment a rubber sleeve (44), provided between adjacent tubular members and between the lowermost tubular member (40) and the connection cable.

The relative lengths of the tubular members typically differ from one tubular member to another. In one embodiment, the tubular members provided at the operatively bottom part of a buoyant member are shorter in length that the tubular members used operatively higher up on the buoyant member. The distance between the tubular members at the operatively bottom part of the buoyant members may also be shorter than the distance between the tubular members towards the operatively upper ends of the buoyant members. The shorter flexible portion between the operatively bottom tubular members provide the ability to ride over a wave front and still remain as an intact barrier while being moved around in the sea current thereby mimicking the natural look of kelp.

The tubular members are made from a plastics material, such as Low Density Polyethylene. The tubular members used during test runs were approximately 8 to 10 cm in diameter and approximately 5 to 7 m in length.

Figure 5:
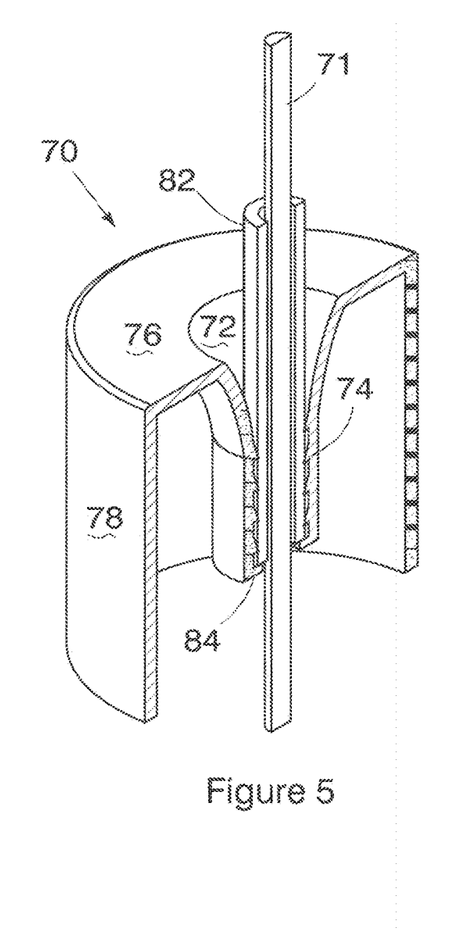
FIG. 5 illustrates a sectional view of an end cap and a sleeve forming part of a shark barrier.

As best shown in FIG. 5, and as mentioned earlier in this specification, each tubular member is secured in place about the spine cable (71) by means of an end cap securable over the ends of each tubular member. An end cap (70) includes a tapered sleeve (72) having internal detents (74), an outwardly extending flange (76) provided at or near an entrance end of the sleeve and a circumferential skirt (78) extending from the flange in the general direction of the sleeve. The outwardly extending flange of the end cap is dimensioned such that the circumferential skirt extending from the flange can be friction fitted over an open end of a tubular member. The entrance end of each end cap is sloped from the outwardly extending flange in the direction of the sleeve so as to guide a rubber spacer (82) into the sleeve. As the flexible rubber spacer is moved along the sleeve, the circumferentially arranged inclined teeth located within the sleeve grips the flexible rubber spacer, which may be a rubber pipe. The flexible rubber spacer must be forced into the sleeve to overcome the inclined teeth. The sleeve includes a stopper (84) located at an end opposite the entrance end, which prevents the flexible rubber spacer from being wholly inserted into the sleeve.

The end caps used during the trial period was manufactured from a plastics material, such as nylon. The manufacturing process typically entails machining or injection moulding.

Figure 6:
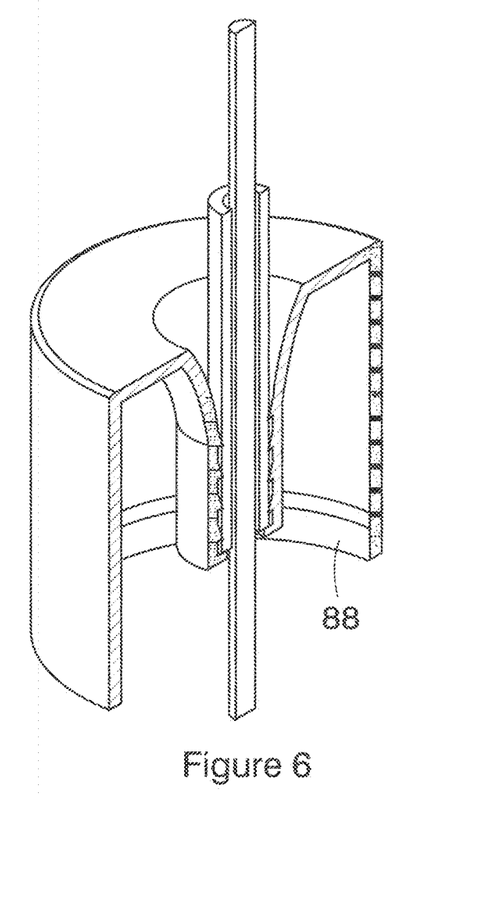
FIG. 6 illustrates a sectional view of a further embodiment of an end cap and a sleeve forming part of a shark barrier.

In an alternative embodiment of the end cap, an engagement formation is provided on an inner surface of its skirt. As shown in FIG. 6, the engagement formation may be a rib (88) located near a free edge of the skirt. A corresponding engagement formation, such as a groove, may be provided on an outer surface of a tubular member for receiving the rib in order to establish a more secure fit between the tubular member and the end cap. A washer may be provided between the skirt of the end cap and the outer surface of the tubular member to keep water from entering the tubular member. It is also appreciated that the inner surface of the skirt may be rubberised to limit the flow of water into the tubular member. It is further appreciated that the corresponding engagement formation located on the skirt and the tubular members are not limited to rib and groove formations as any suitable engagement formation, such as screw threaded or bayonet type engagement formation, may be used.

In yet another embodiment an engagement formation, such as a rib is provided on an outer surface of the end cap's skirt. A corresponding engagement formation, such as a groove, may then be provided on the inside surface of the tubular member. In this embodiment, the skirt of the end cap will thus be located within the end of a tubular member when in use.

The internal detents provided on the sleeve of the closure are not limited to inclined teeth and it is appreciated that any suitable internal detents will suffice. In one embodiment, the internal detents may be deformable projections or a screw thread.

Figure 7:
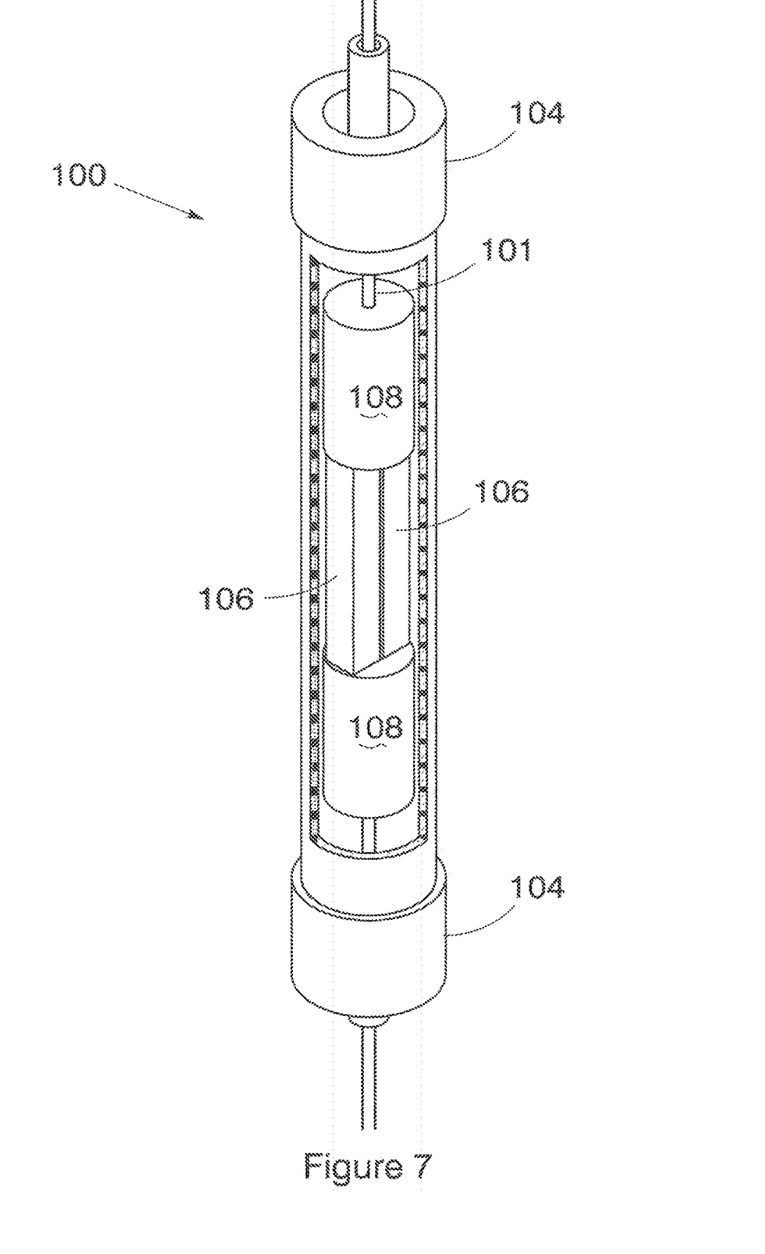
FIG. 7 illustrates a three-dimensional cutaway view of a tubular member of a buoyant member forming part of a shark barrier.

FIG. 7 shows a three dimensional cutaway view of a tubular member (100) secured over a spine cable (101) and forming part of the buoyant member. Housed within the tubular member (100), which is closed at either end by an end cap (104), are two magnets (106), typically of the barium ferrite type, and two sections of buoyant fill (108) to enhance buoyancy of the buoyant member.

Figure 8:
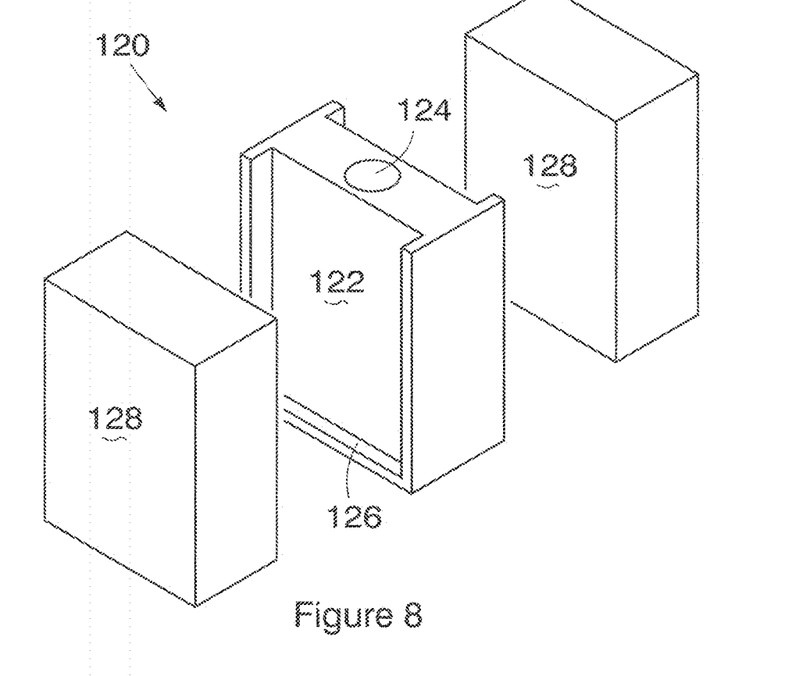
FIG. 8 illustrates a three-dimensional view of a divider and magnets forming part of a shark barrier.

In another embodiment of the invention, the tubular member may include a divider (120) defining two major opposed surfaces (122) as shown in more detail in FIG. 8. The body includes a bore (124) for receiving the spine cable when in use. The divider further includes a skirt (126) about a periphery of either major opposed surface for receiving a magnet (128) on either side of the body.

The buoyant members of the shark barrier are assembled by fitting the rubber sleeves, the tubular members, the magnets, the dividers, the buoyant filling and the end caps over the spine cable such that a divider is located within each tubular member, the end caps being positioned at either end of each tubular member. An end cap is fitted over one end of a tubular member and a buoyant low density polyethylene body is then introduced into the tubular member. Next, the divider is inserted into the tubular member and a magnet is inserted on each major opposed surface of the divider. Additional buoyant low density polyethylene bodies are then introduced into the tubular members and an end cap is fitted over the opposite end of the tubular member.

The carabiner provided at one end of the cable spine is then secured to the horizontal connection cable of the anchoring device.

A great advantage of the shark barrier of this invention is that the cable spine of the buoyant member provides a continuous spine extending from the anchoring assembly to the operatively upper end of the buoyant member. There is thus only one potential point of weakness along the length of the buoyant member, being the securing point where the swivel of the buoyant member is secured to the horizontal connection cable. Rough sea conditions, rip currents and other factors will thus have a limited effect on the buoyant members.

If maintenance or repair work is needed on the shark barrier, the shark barrier can be disassembled with relative ease. The individual connection cables can be removed from the anchors to which they are secured by releasing the carabiner, or any other suitable securing mechanism, from the securing formations located on the anchors. The connection cable, with its buoyant members still secured thereto, can be moved to shallow water or land by boat for repair. The remaining connection cables and their respective buoyant members can thus remain intact and operational. The removed section of the shark barrier can also be easily replaced by a similar section of the shark barrier.

It is appreciated that the buoyant member may be secured to operatively horizontal connection cable of the anchoring assembly in any suitable manner. In one embodiment, the horizontal connection cable of the anchoring assembly includes several attachment formations along its length. The spine cable of each buoyant member has a complementary attachment formation at an operatively bottom free end thereof and the buoyant members are thus secured to the horizontal connection cable by engaging the corresponding attachment formations. The corresponding attachment formations may be of the snap-fit type, screw in type, or any other suitable formation.

It is commonly accepted among divers that sharks avoid kelp forests. When in use, the buoyant members of the shark barrier resemble a kelp forest. This thus forms a physical barrier which sharks tend to avoid. The kelp like appearance of the shark barrier can, in part, be attributed to the spaced apart arrangement of the buoyant members along a length of the horizontal connecting cable and the configuration of the buoyant members.

The cable spine of the buoyant member creates a natural side-to-side movement, mostly dictated by the sea currents. The rubber spacers arranged between the tubular members, are sufficiently flexible to create a natural kelp like movement along the length of the buoyant member, while the buoyant low density polyethylene bodies enclosed within the tubular members maintain the buoyant members in a generally upright condition when in use.

Figure 9:
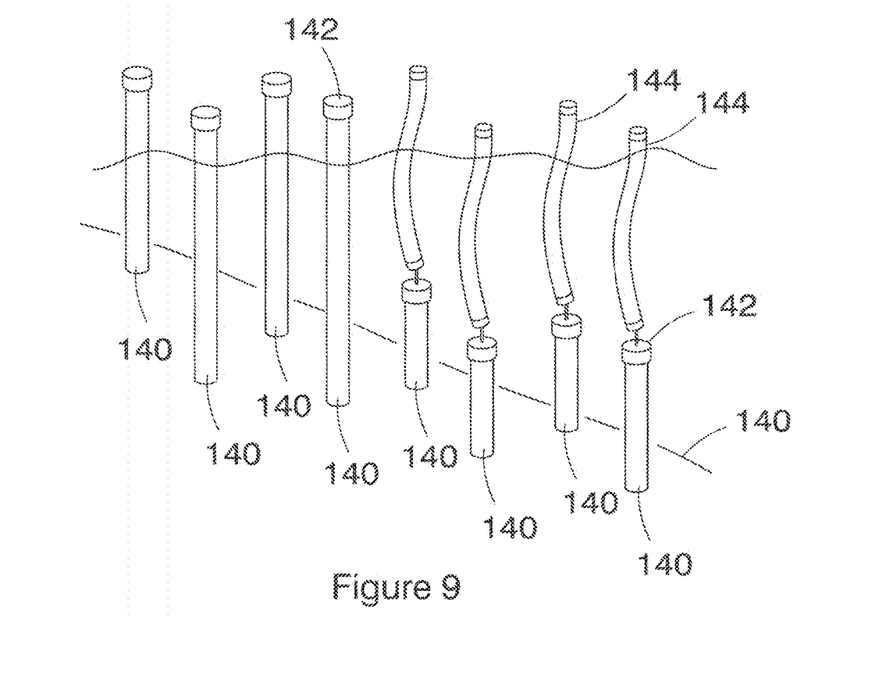
FIG. 9 illustrates a three-dimensional view of an even further alternative embodiment of the shark barrier.

Another advantage of the invention is the versatility of the tubular members of the shark barrier. As shown in FIG. 9, the anchoring assembly may comprise a plurality of tubular members (140) arranged in a staggered formation to define a physical fence having the appearance of a kelp forest. Magnets may be placed inside one or more of the tubular members and the tubular members may be closed by means of end caps (142). As shown in FIG. 9, flexible, elongate buoyant members (144) as described in this specification may also be secured to the end caps of some of the tubular members acting as anchors.

Figure 10:
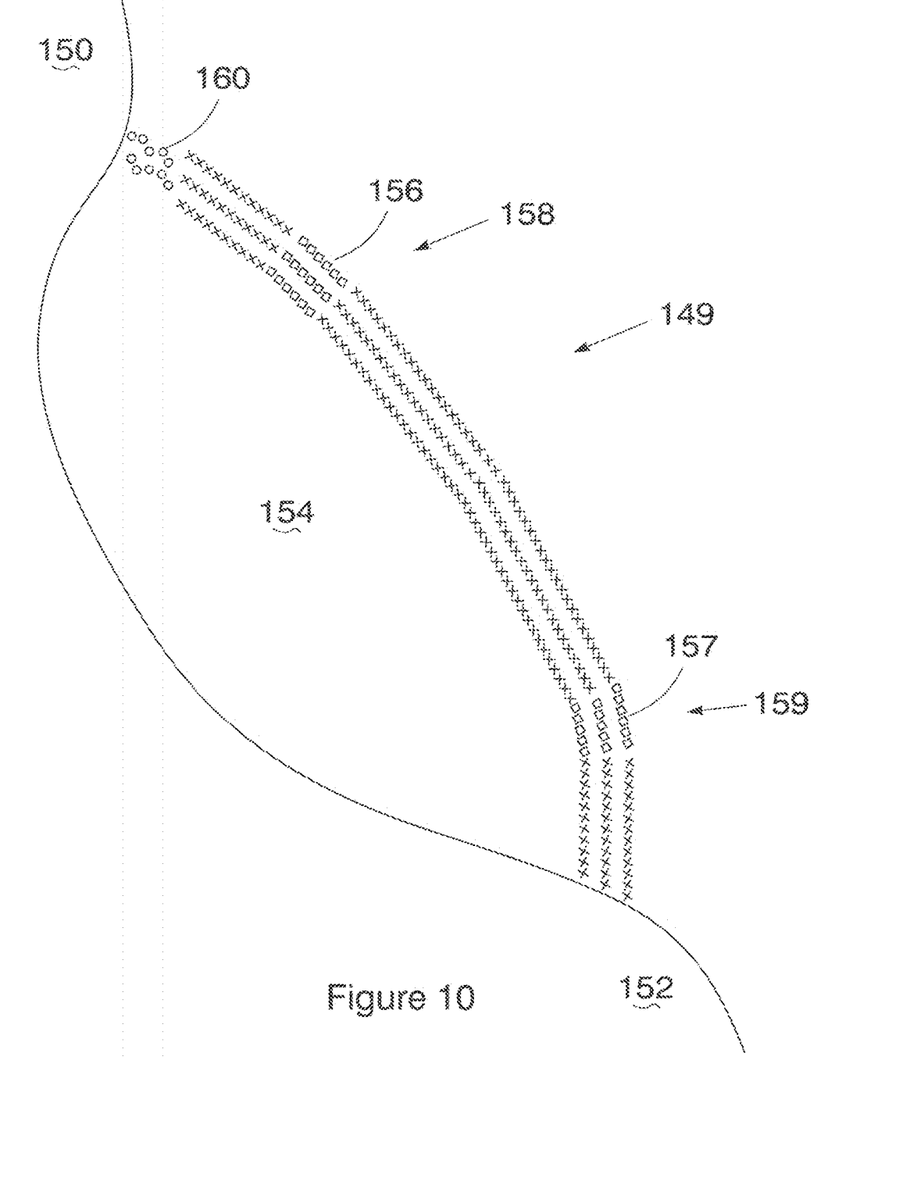
FIG. 10 illustrates a plan view of a still further embodiment of a shark barrier extending between two points of a coastline.

FIG. 10 shows an embodiment of this invention extending between two points of a coastline (150, 152) to enclose a designated shark-free swimming area (154). The shark barrier (149) comprises three rows of anchors and accompanying connection cables and buoyant members. The shark barrier includes two entry zones (156, 157) having longer buoyant members extending from the sea surface. This creates safe routes (158, 159) for boats to use across the shark barrier. Another section of the shark barrier is arranged as a fence (160), as shown in FIG. 9.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A shark barrier comprising an anchoring assembly consisting of multiple interconnected adjacent rows, each row having a pair of anchors in linear arrangement with a flexible connecting element extending between the anchors, and multiple spaced apart buoyant resiliently flexible elongate members secured at one end along a length of the connecting elements to operatively extend generally upwardly from the connecting elements, the buoyant members comprising an elongate flexible spine extending through a series of tubular members.

2. A shark barrier as claimed in claim 1, wherein one or more of the rows comprise three or more spaced apart anchors and a separate flexible connecting element extending between each pair of adjacent anchors.

3. A shark barrier as claimed in claim 1, wherein adjacent linear rows are off-set relative to each other to form a staggered arrangement.

4. A shark barrier as claimed in claim 1, wherein the flexible connecting elements are releasable from the anchors.

5. A shark barrier as claimed in claim 1, wherein the connecting elements extend through a plurality of spacers which are arranged between adjacent buoyant resiliently flexible elongate members extending upwardly from the connecting elements.

6. A shark barrier as claimed in claim 1, having a zone consisting of buoyant resiliently flexible elongate members that are greater in length than the remaining resiliently flexible elongate members, the buoyant resiliently flexible elongate members forming part of the zone being operatively arranged to extend beyond the sea surface to define a passageway for water vehicles.

7. A shark barrier as claimed in claim 1, wherein the buoyant resiliently flexible elongate members include spacers arranged between adjacent tubular members and dimensioned to engage with the tubular members to retain the tubular members in predetermined locations along a length of the flexible spine.

8. A shark barrier as claimed in claim 1, wherein one or more of the tubular members are closed at both ends by an end cap and, the tubular members housing one or more magnets and buoyant material.

9. A shark barrier as claimed in claim 1, wherein the flexible spine is a cable, a rope, a chain or a buoyant tube.

10. A shark barrier as claimed in claim 1, wherein the anchors include multiple spaced apart attachment formations located along a length thereof for removable attachment to the connecting elements.

\* \* \* \* \*